C. POTTEL.
INTERMITTENT GRIP DEVICE FOR LUBRICATING APPARATUS.
APPLICATION FILED JUNE 8, 1911.
1,021,475.
Patented Mar. 26, 1912.
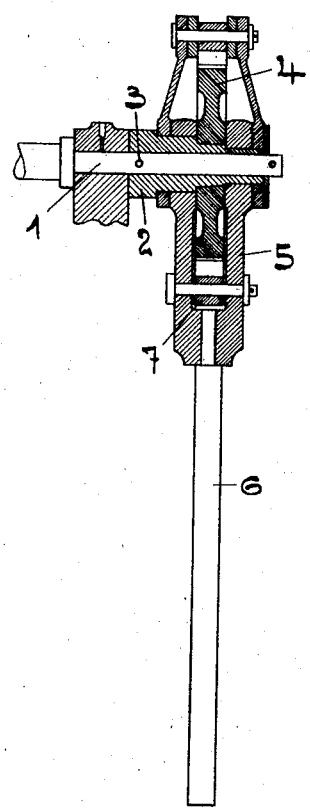
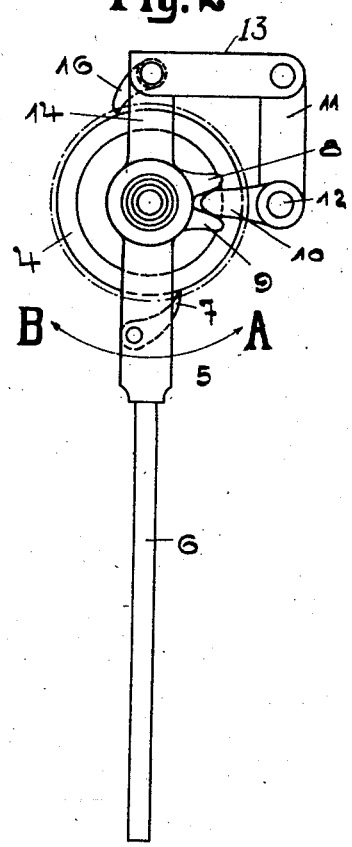
Inventor:
Carl Pottel

UNITED STATES PATENT OFFICE.

CARL POTTEL, OF HALLE-ON-THE-SAALE, GERMANY.

INTERMITTENT GRIP DEVICE FOR LUBRICATING APPARATUS.

1,021,475.  Specification of Letters Patent.  Patented Mar. 26, 1912.

Application filed June 8, 1911. Serial No. 631,959.

*To all whom it may concern:*

Be it known that I, CARL POTTEL, a subject of the Emperor of Germany, residing at Halle-on-the-Saale, Germany, have invented certain new and useful Improvements in Intermittent Grip Devices for Lubricating Apparatuses, of which the following is a clear, full, and exact description.

One drawback of apparatuses for lubrication hitherto in use, which were provided mostly with pawls, or the like, was the pawl permitting the apparatus to work in one direction only; the pawl, or any other similar stop-device, remained inactive while the driving lever was returning, and the ratchet-wheel, and naturally also the apparatus, ceased running. The disadvantage of such construction consisted in the press doing service only one-half of the time, and remaining inactive during the other half. Lubricating in one direction only, as such apparatuses have been doing, may be regarded as another disadvantage. The lubrication apparatus, doing service only when the piston rod of the machine to be lubricated is turned in this one direction, the oil, grease, or the like, always enters the parts to be oiled in the same direction. But in many cases oiling in an opposite direction also is required, in order to attain a uniform lubrication.

This invention relates to intermittent grip devices especially applicable to lubricating apparatuses.

The object of this invention is to do away with the disadvantage mentioned. Still using a single driving lever, the lubrication apparatus is to work both ways; *i. e.* with the forward and with the backward motion of the driving lever. This object has been accomplished by adjusting another pawl to the ratchet wheel, the pawl not having immediate connection with the driving lever, but being connected with it by means of a transmitting mechanism, which is inserted in a manner permitting the pawl to engage the ratchet wheel and to turn it in a direction corresponding to that of the returning driving lever. The pawl is provided with a switching device which enables the lubrication apparatus to be used also in the usual manner.

Figure 1 represents a cross-sectional view of a device embodying my invention; and Fig. 2, a view in side elevation of the same.

The casing 2 is, by means of a pin, fastened to the shaft 1 which may be provided with a worm gear, not shown. The ratchet-wheel 4 is mounted firmly on the casing 2. The fork 5 turns on the casing, and the bar 6 is adjusted firmly to a part of the machinery that moves back and forth; for instance, when it moves forward in the direction A the pawl 7 engages the ratchet-wheel, turning it and also moving the apparatus on.

With the construction of this kind in use up to date, the lubrication apparatus returns in the direction of B in an inactive state. In order to utilize the return for the motion of the oiling apparatus too, another pawl 16 has been provided, which engages the ratchet wheel in the same direction the pawl 7 does. The pawl 16 is connected with the fork 5 by means of a transmitting mechanism, and in such a manner as to put to use the return motion of the pawl. For this purpose two teeth 8 and 9 are connected with the fork; and extending into the former is the pawl 10 of an angular lever that may be turned on the bolt 12. The link or lever 11 of this actuating or link mechanism is connected by means of the connecting link 13 with the links 14, which bears the pawl 16.

The arrangement works in the following manner. When the driving lever 6 moves forward in the way described above, the tooth 9 bears the lever 10 along and upward, moving the parts 11, 13 and 14 to the right, the pawls also running backward until the parts get into the position of Fig. 3; whereas, in returning, the tooth 8 forces the lever downwards, and the parts 11, 13 and 14 now turn to the right. The pawl 16 engages the wheel and turns it in the same way the pawl 7 had turned it (Fig. 4).

I claim:

In combination, a shaft, a ratchet wheel mounted on said shaft, a rod adapted to swing through an ascertained course, a fork connected at its crotch to the top of said rod, the end of each tine thereof being journaled on said shaft on each side of said ratchet, a pawl pivoted in the crotch of said fork in engagement with said ratchet, two teeth integral with the upper part of one tine of said fork, a lever mounted on a stationary pivot, a pawl integral with said lever extending between said teeth, a link pivotally connected to the other end of said lever, two links pivotally connected at one end to the same and pivotally connected at their other ends on each side of said ratchet wheel to the shaft and a pawl pivoted between the tops of the two last mentioned links, substantially as and for the purpose set forth.

Signed this 24th day of May 1911.

CARL POTTEL.

Witnesses:
 ALBERT R. MORAWTZ,
 RUDOLPH FRICKE.

Copies of this patent may be obtained for five cents each, by addressing the "Commissioner of Patents, Washington, D. C."